United States Patent [19]

Aslin et al.

[11] Patent Number: 5,234,017
[45] Date of Patent: Aug. 10, 1993

[54] RESTRICTOR VALVE FOR A METERED LIQUID DISPENSING SYSTEM

[75] Inventors: David J. Aslin, Jackson, Mich.; Edward C. Lewis, Franklin, Tenn.; William C. Marrison, David Zander, both of Jackson, Mich.

[73] Assignee: Aeroquip Corporation, Jackson, Mich.

[21] Appl. No.: 772,770

[22] Filed: Oct. 7, 1991

Related U.S. Application Data

[63] Continuation-in-part of Ser. No. 621,445, Nov. 30, 1990, abandoned.

[51] Int. Cl.⁵ .................... F16K 15/06; F16K 37/00
[52] U.S. Cl. .................................. 137/218; 137/550; 137/554
[58] Field of Search ................ 137/217, 218, 550, 554

[56] References Cited

U.S. PATENT DOCUMENTS

| | | | |
|---|---|---|---|
| 1,755,993 | 4/1930 | Kelley et al. | 137/218 |
| 2,306,012 | 12/1942 | Campbell | 137/512 |
| 2,772,693 | 12/1956 | Boileau et al. | 137/218 X |
| 3,326,087 | 6/1967 | Gohlke et al. | 137/554 X |
| 3,857,350 | 12/1974 | Rohan | 137/554 X |
| 3,896,280 | 7/1975 | Blake | 137/554 X |
| 4,603,707 | 8/1986 | Gregoire et al. | 137/554 X |
| 4,618,824 | 10/1986 | Magee et al. | 137/554 X |
| 4,827,538 | 5/1989 | Heimann et al. | 137/217 X |
| 4,986,304 | 1/1991 | Vanderjagt | 137/614.02 |
| 4,986,782 | 1/1991 | Severtson | 137/554 X |

FOREIGN PATENT DOCUMENTS

| | | | |
|---|---|---|---|
| 0116739 | 8/1984 | European Pat. Off. | 137/625.64 |
| 3805462 | 8/1989 | Fed. Rep. of Germany | 137/217 |
| 57-137782 | 8/1982 | Japan | 137/218 |

*Primary Examiner*—Gerald A. Michalsky
*Attorney, Agent, or Firm*—MacMillan, Sobanski & Todd

[57] ABSTRACT

A restrictor valve functions as an outlet valve in a metered liquid dispensing system and utilizes a spring biased, shiftable anti-siphon check valve to prevent fluid flow back from the receiving tank into the system. The restrictor valve is attached to the delivery end of the system discharge hose. The dispensing system is controlled by a central electronic unit and the restrictor valve includes a sensing unit for signalling the electronic control when liquid is present at the outlet. The restrictor valve is connected to the receiving tank by a low spill coupling to minimize escape of the liquid into the environment. The restrictor valve may also include a vacuum breaker valve which admits air into the discharge hose when the system pump is run in reverse to remove the prime from the discharge hose.

9 Claims, 12 Drawing Sheets

RESTRICTOR VALVE FOR A METERED LIQUID DISPENSING SYSTEM

CROSS REFERENCE TO RELATED APPLICATION

This application is a continuation-in-part of U.S. patent application Ser. No. 07/621,445, filed Nov. 30, 1990, now abandoned.

BACKGROUND OF THE INVENTION

This invention relates in general to a metered liquid dispensing system and, in particular, to a restrictor valve which functions as an outlet valve in such a system.

Chemical treatment of crops is extensively used in the field of agriculture. Two major areas in which chemical treatments are used are fertilization and insect control. In order to minimize distribution costs, the chemicals are usually sold to the distributor in bulk shipments of concentrated liquid. The distributor then dispenses smaller portions of the concentrate to the farmer by pumping the needed amount from a bulk storage tank. The farmer adds water to dilute the chemicals to the proper concentration before applying them to his crops.

To get maximum effect from the chemical without damaging the crop, the amount of chemical used is extremely critical. The chemical manufacturer will specify the desired ratio of chemical to water that should be used. The total amount of chemical needed is then calculated and dispensed based upon the total volume of the farmer's container. Furthermore, because the chemicals are concentrated, they can be very expensive. Thus, precise control and accurate measurement of the amount delivered to the farmer is important. Careful handling is needed because, in their concentrated form, the chemicals could have an adverse effect upon the environment and anyone coming into contact with them if spilled.

SUMMARY OF THE INVENTION

The present invention concerns a restrictor valve located at the end of a discharge hose in a metered liquid dispensing system. The restrictor valve functions as an outlet valve and is connected to a container into which liquid is to be dispensed by a low spill coupling. The restrictor valve is provided with an anti-siphon check valve which prevents liquid flow from the user's container back into the system.

The restrictor valve is also provided with a liquid detecting device for sensing when liquid has reached the end of the discharge hose, and signalling an electronic control for the dispensing system of this condition. Upon receipt of the signal, the electronic control will begin metering the amount of liquid being delivered. This ensures that any amount of liquid pumped into the discharge hose during priming of the system is not recorded as a portion of the amount to be metered.

The restrictor valve may include a vacuum breaker valve located at the end of the discharge hose immediately before the anti-siphon valve. A vacuum breaker valve is needed to support liquid dispensing systems which incorporate an optional "drain back" feature. With "drain back", any liquid remaining in the discharge hose is pumped back into the system supply tank after completion of the dispensing operation. The vacuum breaker opens to allow air to enter the discharge hose as the pump is operated in reverse to empty the hose. An additional safety check valve is included between the vacuum breaker valve and the hose and further ensures containment of the liquid in the event the breaker valve fails to close.

Other features and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
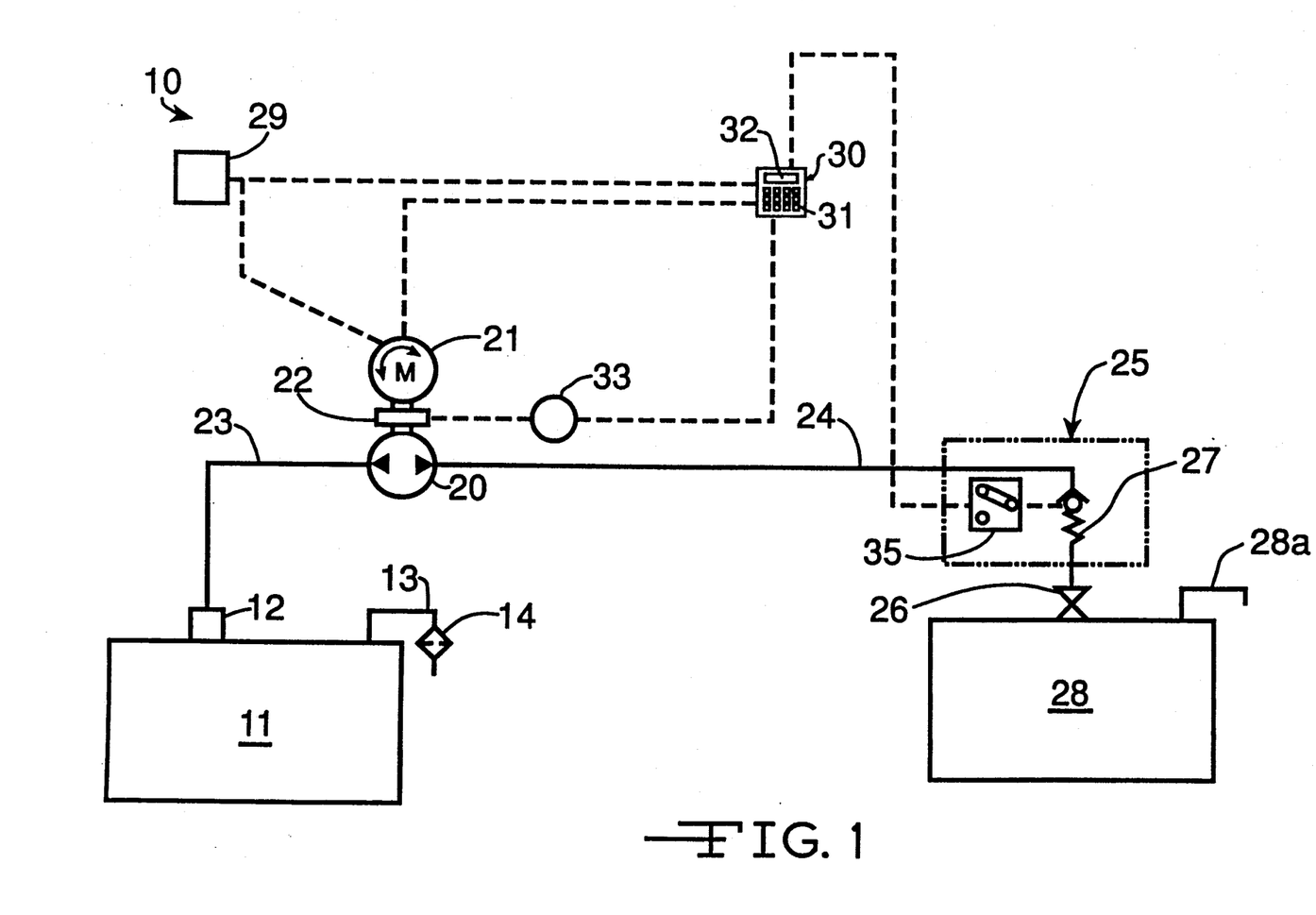
FIG. 1 is a schematic diagram of a dispensing system embodying the principle features of the present invention

Referring now to FIG. 1, there is illustrated a metered liquid dispensing system, indicated generally at 10, and embodying the principle features of this invention. In FIG. 1 and the other schematic diagrams, electrical/magnetic connections and/or coupling between components are represented by dashed lines, while liquid connections and/or lines are represented by solid lines. The liquid, often a concentrated chemical, is kept in a supply tank or container 11 which could be any number of devices ranging from a tank mounted on a truck or an easily portable ten gallon container. The supply container 11 has a low spill coupling 12 and an atmospheric vent 13. The vent 13 is equipped with an air outlet filter 14 to prevent airborne liquid droplets from escaping to the atmosphere. The low spill coupling 12 can be of the type described in U.S. patent application Ser. No. 494,644, filed Mar. 16, 1990 now U.S. Pat. No. 5,129,423, and herein incorporated by reference.

The liquid in the supply container 11 is pumped by a positive displacement gear pump 20. The gear pump 20 is driven by a reversible motor 21 through a gear reducer 22. The gear reducer 22 is selected with a gear ratio to match the motor speed to the pump requirements. While the motor 21 can be any of a number commercially available, a 12 volt DC motor is convenient for use if the dispensing system is to be mounted on a vehicle such as a truck, since it would be compatible with the vehicle's electrical system.

The liquid is drawn from the supply container 11 through a suction hose 23 by the gear pump 20 and then pumped through a discharge hose 24 to a restrictor valve 25 which in turn is connected to a low spill dispensing coupling 26. The restrictor valve 25 is provided with an anti-siphon check valve 27 which is typically connected directly to the dispensing coupling 26 to prevent backflow into the discharge hose 24. The liquid is discharged into a user's receptacle 28, which may also have an atmospheric vent 28a. The user's receptacle 28 may be any one of a number of devices. For example, it may be the feed tank on a tractor towed field sprayer. Water is typically added to the receptacle 28 to dilute the chemicals to a concentration that can be safely applied to the crops. Electrical power is provided to the motor and other transfer system components through an external power source 29 such as a battery, for example.

The dispensing operation is controlled by a microprocessor-based electronic control 30 which may be mounted directly on the gear pump/motor assembly or attached by means of a cable harness. The user enters specific data concerning a particular dispensing operating into the control 30 by means of a keypad 31. The control 30 also has an alphanumeric LCD 32 to prompt the user through the associated program, and to provide information to the user during the dispensing operation. As will be discussed, the control 30 monitors various system operating parameters, and controls the operation of the motor 21 to achieve a desired preprogrammed dispensing operation.

Because the gear pump is a positive displacement type, a precisely known, fixed volume of liquid is displaced with each revolution or fraction of revolution of the pump drive shaft. In accordance with the present invention, a transducer 33 is coupled to sense the rotation of a rotating element in the gear pump/gear reducer/motor assembly. For example, the transducer 33 can sense the rotation of the gear pump drive shaft by counting teeth of a drive gear or target wheel, and provide this information to the electronic control 30. Once the system is primed, the control is then able to precisely control the amount of dispensed liquid by monitoring the rotation of the drive shaft. The transducer can be one of several well known configurations such as, for example, a passive variable reluctance magnetic transducer, or a Hall effect device.

A liquid detecting device 35 is incorporated in the restrictor valve 25 to signal the control 30 when prime has been established in the discharge hose 24. The device 35 can be, for example, a reed switch which is responsive to movement of a magnet carried by the anti-siphon check valve 27 which is designed to actuate the reed switch only upon sensing liquid flow. During priming of the discharge hose, while air within the hose 24 is forced through the restrictor valve 25, no liquid will be present at the valve, and the reed switch will be unactuated, thus signalling the electronic control that no liquid is being discharged. The electronic control 30 will not count liquid being pumped during the priming operation as a portion of the batched amount. Once liquid is present, the reed switch will be actuated, and the electronic control will begin to monitor the amount of liquid being pumped. Also, should an air pocket be present in the discharge hose 24 during a dispensing operation, the reed switch will become unactuated to signal the electronic control of this condition, and this volume of air will not be applied to the desired batched amount.

It should be noted that, while the liquid detecting device 35 is shown in FIG. 1 as being directly wired to the electronic control 30, in some instances it may be desirable to use a "wireless" connection. In this case, the restrictor valve 25 would carry a small, battery operated transmitter, and a receiver would be located at the electronic control 30.

Figure 2A:
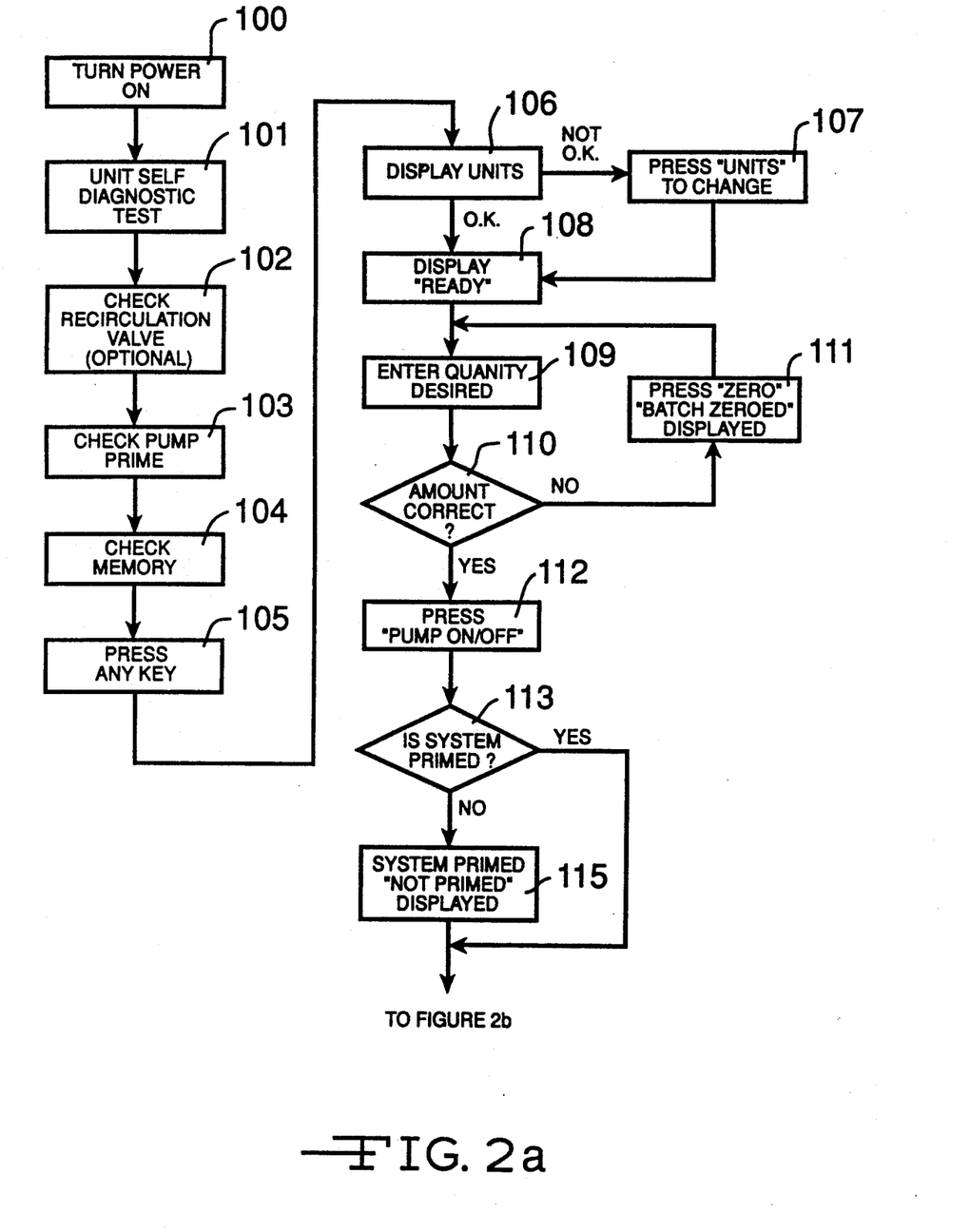
FIGS. 2a and 2b are flow charts illustrating the operation of the dispensing system.
Figure 2B:
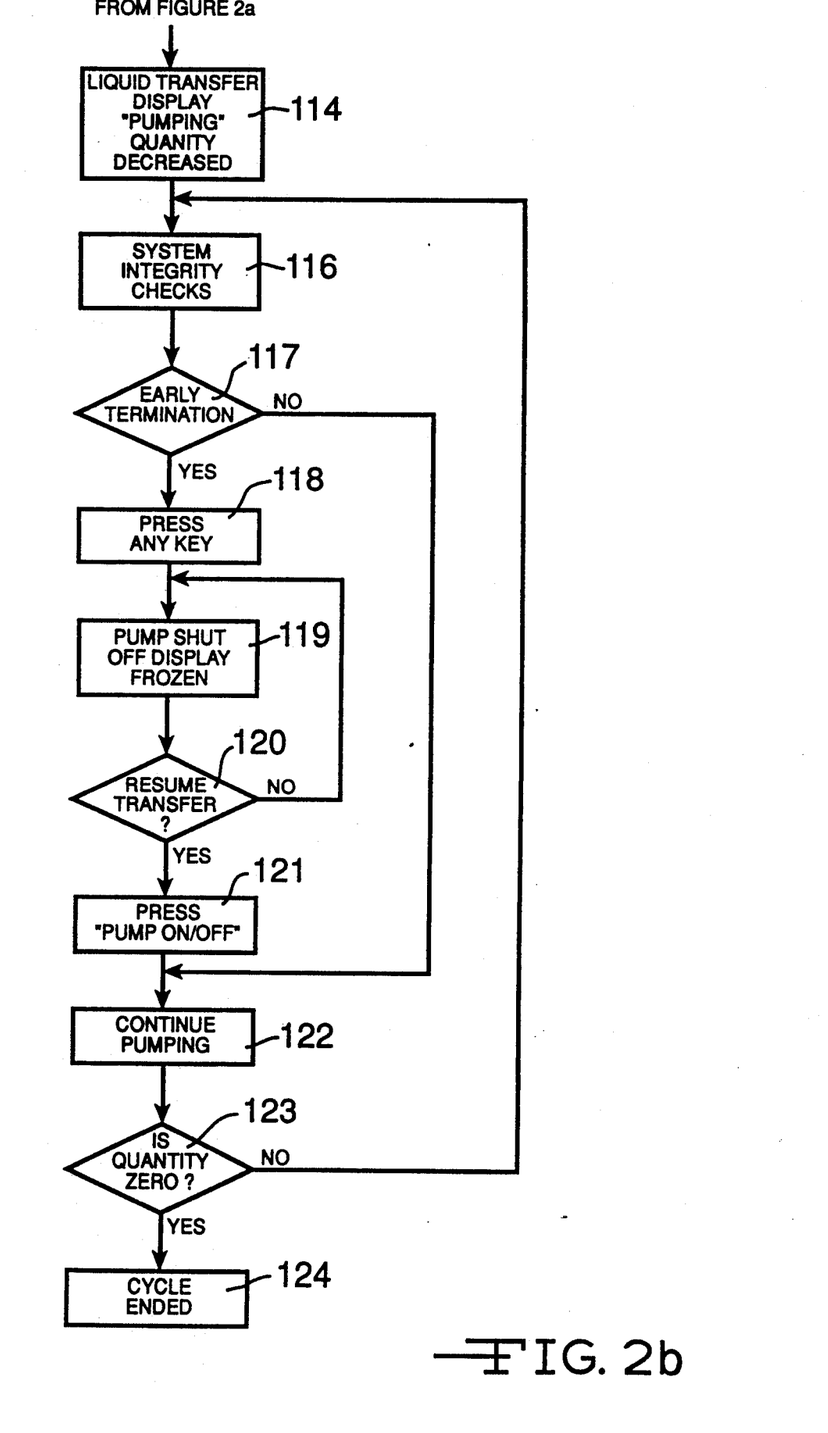
Figure 3:
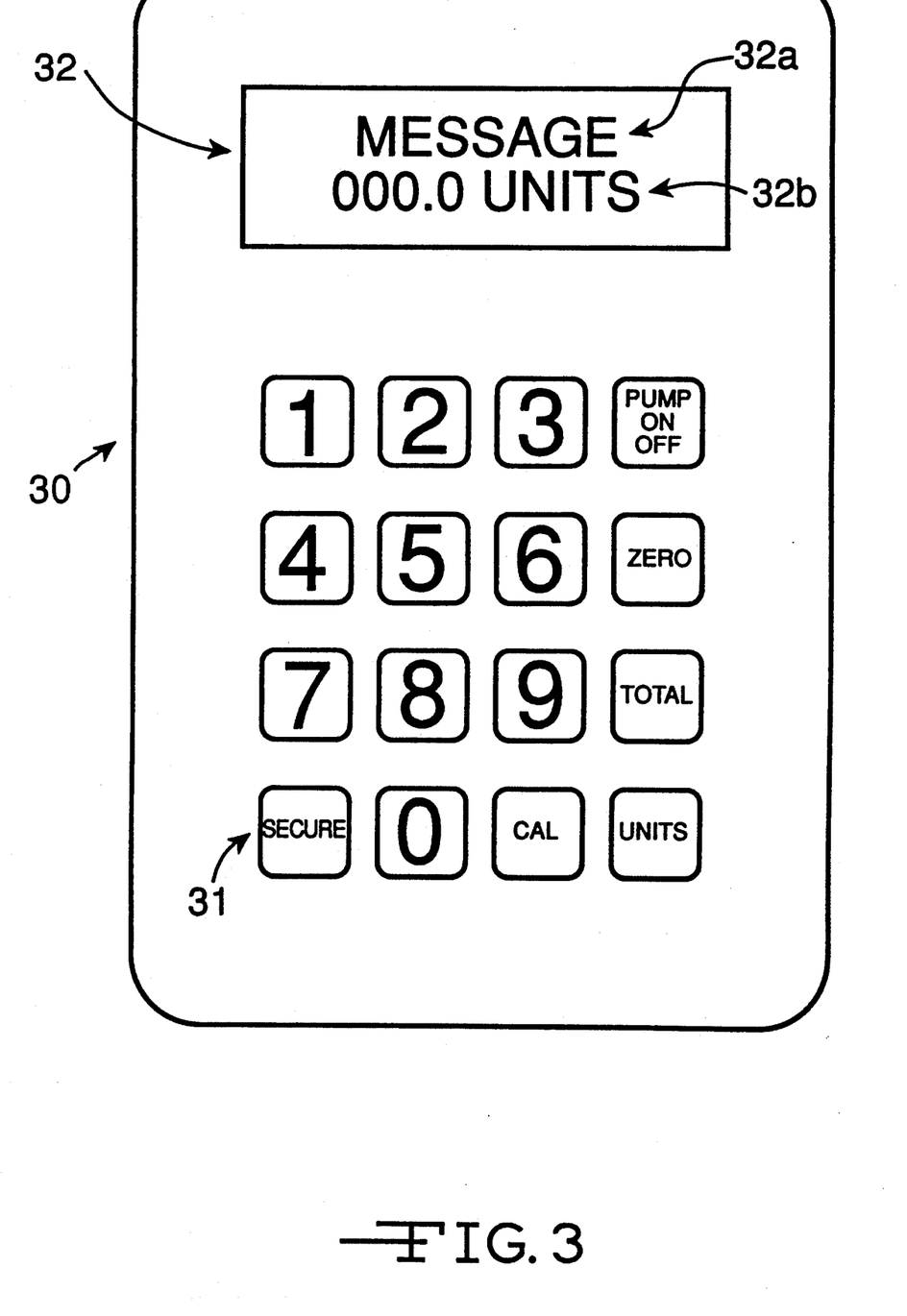
FIG. 3 is a plan view of an electronic control keypad which can be used to operate the system.

The operation of the dispensing system 10 by a typical user will now be described in more detail with the aid of the flow diagrams of FIGS. 2a and 2b, with reference to the key pad diagram of FIG. 3 and the schmatic of FIG. 1. The user first connects the dispensing coupling 26 to the user's receptacle 28 (shown in FIG. 1). He then, as shown in step 100 of FIG. 2a, supplies power by connecting the system to the power source 29. Upon receiving power, the electronic control 30 initiates a series of system integrity tests at 101. First, a series of self diagnostic tests are performed. If any of the diagnostics fail, an error message is displayed (as shown in FIG. 3) on the top line 32a of the LCD display 32 and the control 30 is disabled. If the system is equipped with an optional recirculation valve (described below with respect to FIG. 5), the valve is checked at 102 to assure it is in the dispensing position.

Next, the system is checked for prime at 103. Prior to recording the amount of liquid being pumped, the discharge hose 24 must be primed. This hose may be rather long, as when it is necessary to transfer liquid from a supply truck to farm machinery in the field. The liquid detecting device 35, as mentioned above, is provided to signal the control 30 when the prime in the discharge hose 24 is established. The detecting device 35 is incorporated in the restrictor valve 25, which is located adjacent to the dispensing coupling 26. If no liquid is present at the detecting device 35, the message "NOT PRIMED" will be displayed on the top line 32a of the LCD display 32 and the user must prime the discharge hose 24. This is accomplished by pressing any key on the key pad 31 which causes the pump to run for a predetermined time to establish prime. As the discharge hose 24 fills with fluid, air is displaced through the restrictor valve 25 into the user's receptacle 28. Once the presence of the liquid is detected, a signal is sent to the electronic control 30, the gear pump 20 is stopped, and the integrity tests continued. If no signal is received within a predetermined time to indicate prime has been established, it is assumed that there has been an equipment malfunction, and the control 30 will shut down the dispensing system. Once the prime is confirmed, the main memory is checked at 104.

After successfully completing all the system integrity tests, the controller will display "IDLE" on the top line 32a of the LCD display 32. Pressing any key at 105 causes the system to display (at 106) the last remaining batch quantity and units, i.e., gallons, quarts, etc., present at the preceding system power down, on the LCD display bottom line 32b. The user may change the units (at 107) by depressing a "UNITS" key on the key pad 31. An alternate choice for the units will be displayed each time the "UNITS" key is depressed. The operation is repeated until the desired units are displayed. Any batch quantity shown on the bottom line 32b will be zeroed when the units are changed. The system then responds at 108 with "READY" on the LCD display top line 32a.

The user now enters (at 109) the batch quantity of liquid to be dispensed, which amount will be displayed on the bottom line 32b of the LCD display 32. If an error is made, a correction from step 110 is easily made at 111 by pressing a "ZERO" key on the key pad 31 and reentering the quantity. Once the correct amount has been entered, a "PUMP ON/OFF" key on the key pad 31 is pressed at 112 to start the liquid transfer. The control 30 again checks at 113 to confirm that the system is primed. If system prime exists, the control 30 starts the motor 21 at 114 (in FIG. 2b) and the gear pump 20 begins to pump liquid from the supply tank 11. As previously mentioned, the transducer 33 senses the rotation of the gear pump drive shaft and transmits the information to the electronic control 30 which calculates the volume of liquid being pumped. The quantity displayed on the bottom line 32b of the LCD display 32 is decreased in accordance with the signal being received from the transducer 33. Thus, throughout the liquid transfer, the LCD display 32 indicates the amount of liquid remaining to be transferred. The top line 32a of the LCD display will display the message "PUMPING" during the liquid transfer.

If the system is not primed, the quantity displayed is held constant while the gear pump 20 is run until either system prime is established or a predetermined time elapses. Should the predetermined time elapse without the system prime being established, the system is shut down at 115 (FIG. 2a) and a message "NOT PRIMED" is displayed on the top line 32a of the LCD display 32.

The liquid is pumped through the restrictor valve 25 into the user's receptacle 28. As the liquid is transferred, the control 30 continuously repeats (at 116 in FIG. 2b) the system integrity tests described above. Failure of any of the diagnostic tests or the memory check will stop the gear pump and cause an appropriate error code to be displayed on the top line 32a of the LCD display 32. If system prime should be lost, the control 30 will attempt to reestablish prime as described above. If the transducer 33 ceases to send a signal, the quantity display will be held constant for a predetermined time. If transducer operation does not resume after the time has elapsed, the system is shut down and a message "SENSOR COUNT" is displayed on the top line 32a of the LCD display 32.

The pumping may be interrupted (at 117) at any time by pressing (at 118) any key on the key pad 31, which shuts off the pump and freezes the display (at 119). Upon pressing a "TOTAL" key, the total amount of liquid delivered will be displayed. Pumping is resumed at 120 by pressing the "PUMP ON/OFF" key at 121.

The system will continue at 122 to transfer the liquid from the supply container 11 to the user's receptacle 28 until the displayed total on the bottom line 32b of the LCD 32 reaches zero. When zero is reached at 123, the control 30 will turn off the motor 21 and the gear pump 20 and the transfer cycle is ended at 124.

The electronic control 30 is capable of other functions which are of interest to the liquid product supplier. The system may be recalibrated if a fluid of a different viscosity is to be pumped. To recalibrate, the supplier would first press a SECURE key on the key pad 31 and then key in a preassigned numeric code which will be displayed on the bottom line 32b of the LCD display 32. If there is an error in the entered numeric code, the supplier would press the "ZERO" key to cancel the entry and then reenter the numeric code. When the code is correctly entered, the supplier presses a "CAL" (Calibrate) key to load the calibration data into the electronic control 30.

The supplier can also zero a running total which is held in the control memory unit. The running total indicates the total amount of liquid dispensed during several deliveries. Finally, the supplier can change the lowest level security code "LCODE" (Lower Code Number) to prevent unauthorized persons from changing the calibration setting or zeroing the stored running total.

Figure 4:
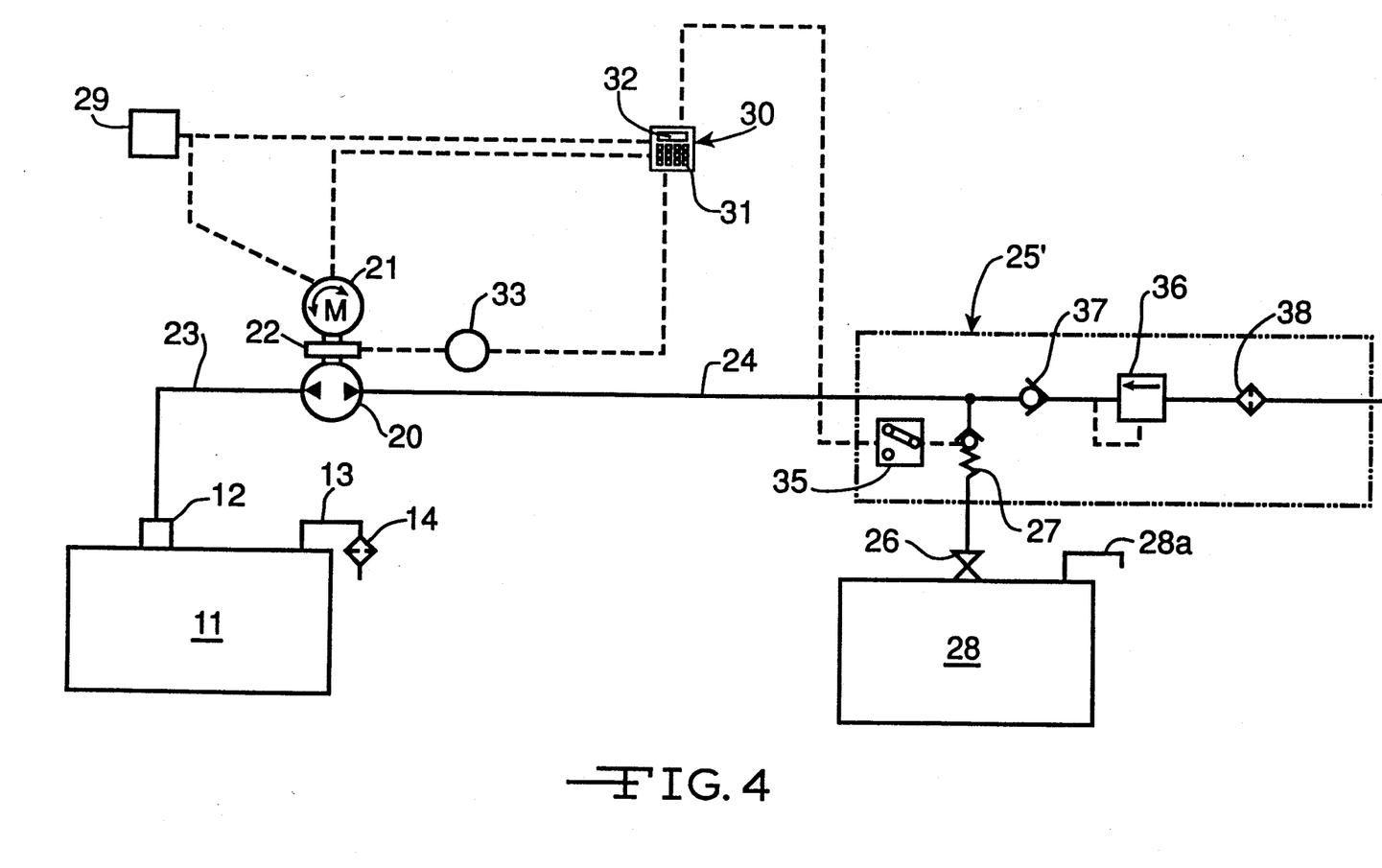
FIG. 4 is a schematic diagram of an alternate embodiment of the dispensing system which includes means to drain back liquid from the discharge hose into the supply tank.

An alternate embodiment of this invention is shown in FIG. 4, wherein the system of FIG. 1 is provided with means to enable the liquid which remains in the discharge hose 24 after the metered dispensing operation to be drained back into the supply tank 11. This prevents cross-contamination of liquids (when the supply tank 11 is switched with another supply tank having a different liquid) and also ensures that the user is not charged for liquid he has not used and which otherwise would remain in the hose 24. In order to drain the discharge hose 24, the pump is operated in reverse, and a modified restrictor valve 25' is provided with means to introduce air into the end of the hose 24 to prevent an excessive vacuum pressure from forming which could stall and overload the pump motor and possibly cause the hose to collapse. In particular, as shown in FIG. 4, the restrictor valve 25' includes a vacuum breaker valve 36 which, upon sensing a positive differential pressure between the atmospheric pressure and the pressure in the hose 24, will open to allow air to enter the hose 24.

In the unlikely event the vacuum breaker valve 36 fails to close when the system is returned to the dispensing mode after drain back, the system is provided with additional safety features to prevent fluid from escaping from the system. First, as shown in FIG. 4, a reverse flow safety check valve 37 is located between the vacuum relief valve 36 and the hose 24 to prevent liquid flow past the valve 37. Second, in the event that both the vacuum breaker valve 36 and the check valve 37 fail to contain the fluid, an air inlet filter 38 is connected to the air inlet side of the valve 36 to provide a sufficient restriction to prevent the fluid from escaping at a high flow rate. The filter 38 also prevents contamination of the system by airborne particles.

The draining of the discharge hose 24 is automatically controlled by the electronic control 30. To initiate a "drain back" cycle, the user sequentially presses the "PUMP" ON/OFF and "SECURE" keys on the keypad 31. The electronic control then reverses the motor 21 which causes the gear pump 20 to pump in the direction from the user's receptacle 28 to the supply container 11. The anti-siphon valve 27 prevents removal of liquid from the user's receptacle 28. When the pressure within the hose 24 drops below atmospheric pressure, the vacuum relief valve 36 opens to allow air to enter the discharge hose 24 through the check valve 37 as the liquid is pumped from the line 24 and into the supply container 11. The pump 20 is run in reverse for a predetermined time based upon the capacity of the hose 24. During this time, the message "DRAINING" will appear on the LCD 32. Upon elapse of the predetermined time, the pump 20 is turned off, and the air pressure within the hose 24 will equalize with atmospheric pressure, thus causing the vacuum relief valve 36 to close. The draining operation may be stopped at any time by the user pressing any key on the keypad 31.

Figure 5:
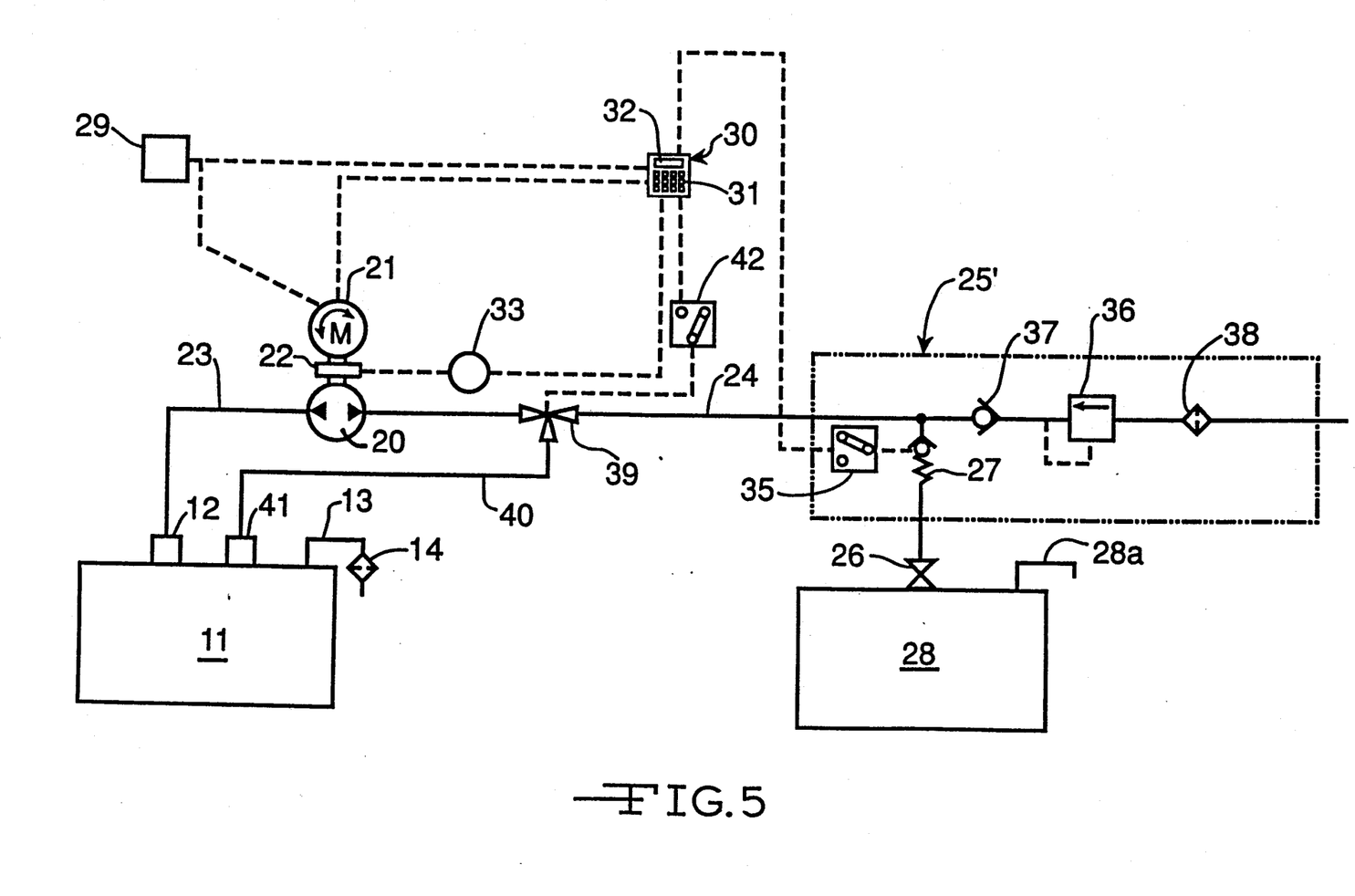
FIG. 5 is a schematic diagram of another alternate embodiment of the dispensing system which includes means for recirculating liquid through the supply tank.

Another alternate embodiment of the invention is shown in FIG. 5, wherein the system of FIG. 1 is provided with means to recirculate liquid through the supply tank 11 to thoroughly mix the contents therein. The recirculation function is typically required when it is desired to maintain micro-encapsulated particles that may be contained in the liquid in suspension. To achieve this function, a three way, non-metering, manually operated recirculation valve 39 is inserted into the discharge hose 24 between the gear pump 20 and the restrictor valve 25. The recirculation valve 39 can divert the liquid from the hose 24 into a recirculation line 40, through a recirculation coupling 41 and into the supply container 11. The recirculation coupling 41 may be of a low spill design. Since the valve 39 is of the non-metering type, fluid cannot flow to both the hose 24 and the line 40 at the same time. A recirculation sensor 42 is coupled to sense when the valve 39 is in the recirculating position, and signals the electronic control of this condition. The sensor can be a reed switch and a magnet which is incorporated into the valve structure.

The recirculation mode is initiated by the operator by manually moving the valve 39 to a recirculating position. When moved to this position, the valve 39 diverts the liquid flow to the supply container 11, and signals the electronic control 30 to start the motor. When in this mode, the control 30 will display the message "RECIRCULATING" and the total elapsed recirculation time on the LCD 32. Thus, the user may accurately follow any manufacturer's recommendation concerning recirculation times for a particular liquid. While the recirculation mode is in use, the control 30 is inhibited from recording the amount of fluid being pumped.

When the needed time of recirculation has passed, the user can return the valve 39 to its original flow-through position. When this happens, the recirculation valve 39 switches the liquid flow back to the discharge hose 24 and the electronic control 30 returns the transfer system to "READY" status.

Figure 6:
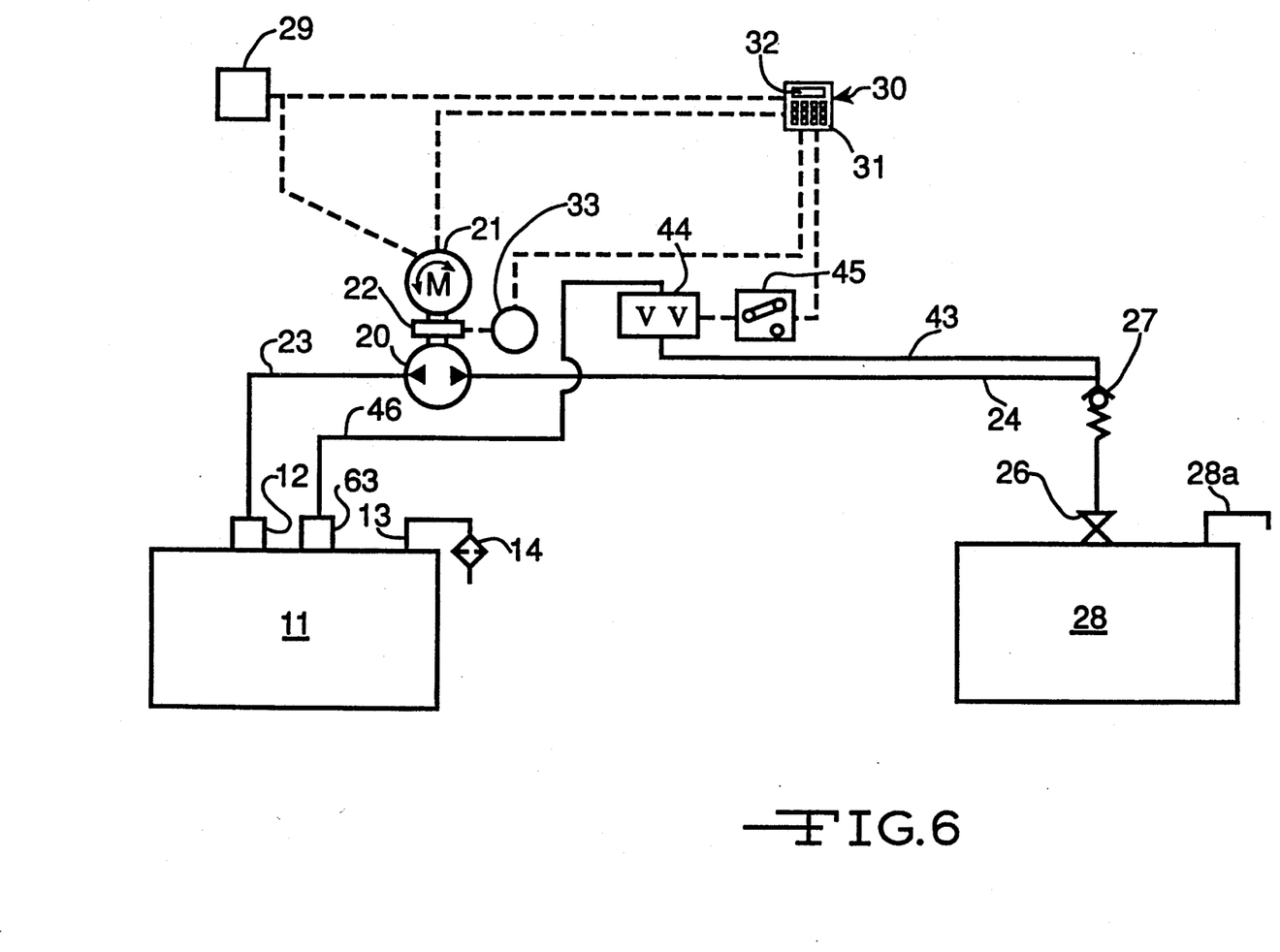
FIG. 6 illustrates a further alternate embodiment of the dispensing system wherein a float-operated vent valve is used to detect when the system is primed.

A further alternate embodiment of this invention is shown in FIG. 6, wherein an alternate means is provided for detecting when liquid has reached the anti-siphon valve 27, indicating that the system is primed. In this embodiment a second, smaller diameter fluid line 43 runs alongside the main discharge hose 24 and is connected between the upstream side of the anti-siphon valve 27 and a float type vent valve 44 which can be mounted on the pump housing, and can be coupled to actuate a reed switch 45 which signals the electronic control 30 that the system is primed overflow line 46 is connected between the valve 44 and the supply tank 11. When liquid has been pumped completely through the hose 24 and has returned to the pump via the line 43 to raise the float and actuate the reed switch 45, the control will be signalled that the system is primed. It should be noted that, in this embodiment, the dispensing coupling 26 must remain disconnected from the user's container 28 until the system is primed. Otherwise, during the venting process, some liquid may be dispensed and not registered, and the system may not vent itself. Since the dispensing coupling 26 is of the low spill design, a shut off feature is built into the coupling to prevent fluid leakage when it is disconnected.

To prevent overload of the pump motor during the venting process, a thermally actuated circuit breaker (not shown) can be provided to monitor the current draw of the motor 21. If a predetermined pressure in the discharge hose 24 is exceeded, the increased current draw of the motor 21 will cause the circuit breaker to trip and the power to the motor 21 will be interrupted.

Figure 7:
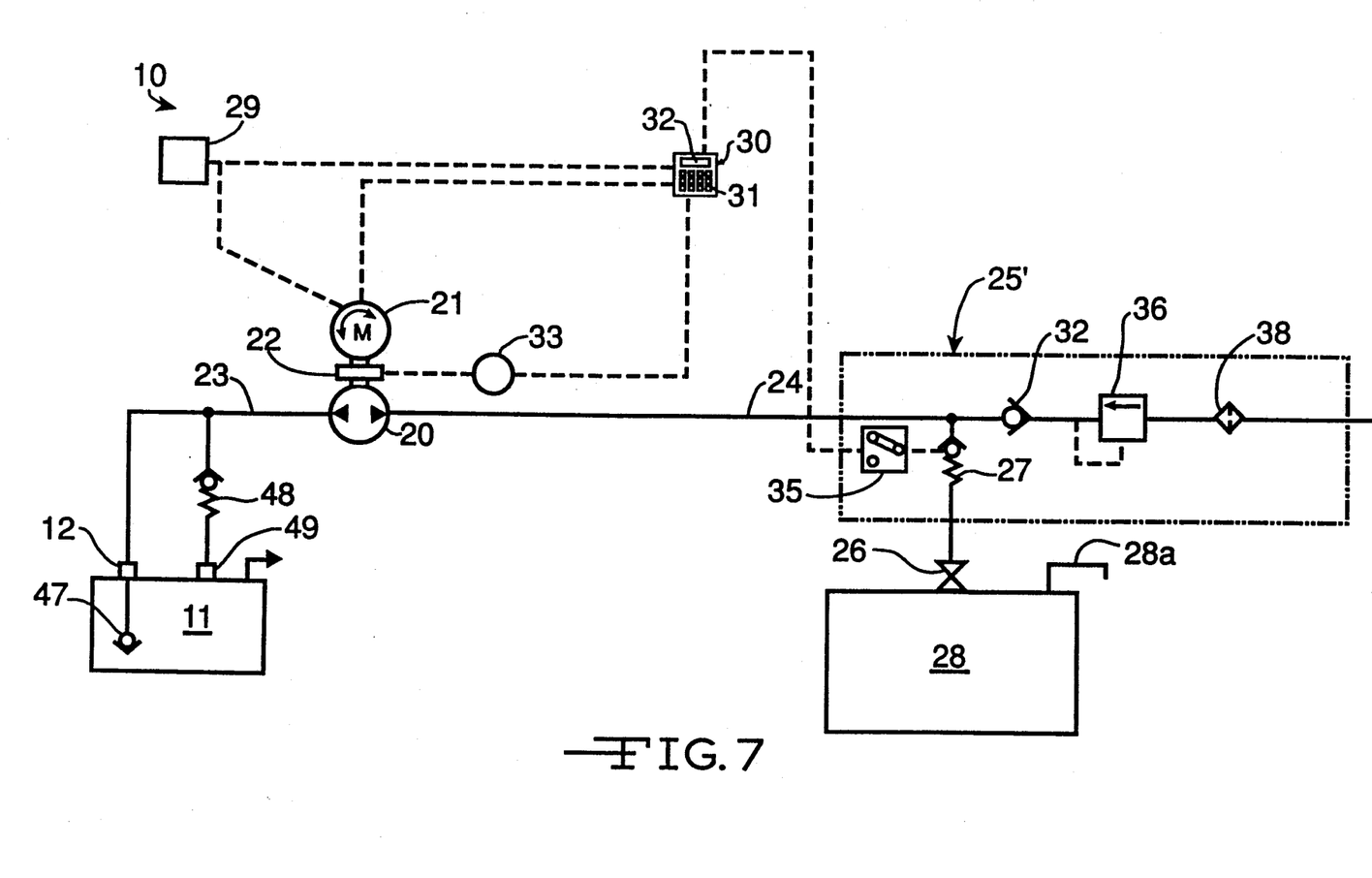
FIG. 7 is a schematic diagram of an alternate embodiment of the dispensing system which includes a suction probe foot valve and a drain back relief valve.

FIG. 7 illustrates an alternate embodiment of the dispensing system shown in FIG. 4 wherein a suction probe foot valve 47 (connected to the coupling 12) and a drain back relief valve 48 (connected between the line 23 and a coupling 49) have been added to the system to prevent liquid in the system from returning to the supply tank 11 after pumping has been temporarily suspended. The foot valve 47 improves system accuracy by preventing drain back into the tank due to ballooning of the discharge hose 24 and pressure equalization conditions, while the normal drain back valve 48 is included to allow the drain back function which occurs when the motor is reversed and the line 23 is pressurized to overcome the preload of the spring in the valve 48. In some instances, it may be desirable to connect the relief valve 48 to the tank 11 through the coupling 12.

Having described the various operating systems of the present invention, some of the specific components of the system will now be discussed in more detail. In particular, referring first to FIGS. 8 through 13, the gear pump 20, along with the gear reducer 22 and the drive motor 21, will now be discussed. The gear pump 20 is a positive displacement involute spur gear type pump. The pump includes a pump housing 50 and a cover 51 secured to the housing 50 by a plurality of cap screws 54. The cover 51 includes a pair of pump ports 51a and 51b for connection to suction hose 23 and discharge hose 24, respectively.

Figure 8:
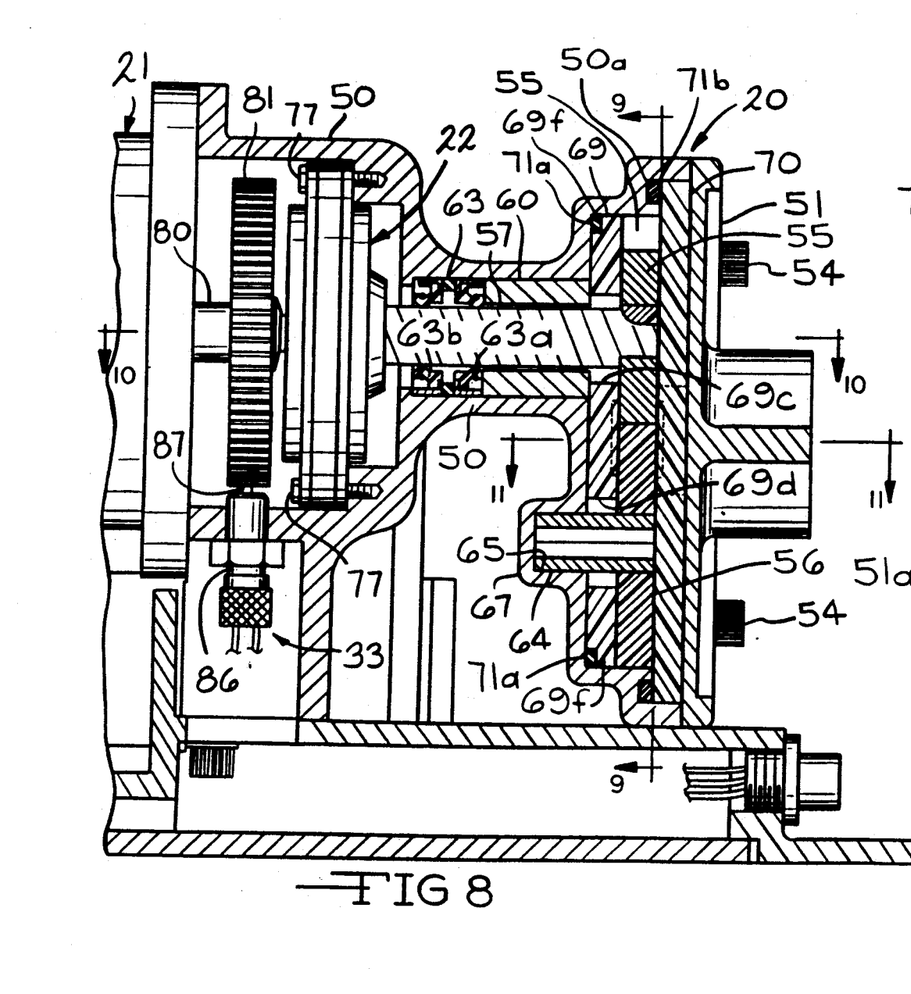
FIG. 8 is a sectional view (taken generally along the line 8—8 of FIG. 10) through a gear pump and pump housing which can be utilized with the system of the present invention.

The pump housing 50 and the cover 51 cooperate to define a chamber wherein a pair of spur gears 55 and 56 are rotatably supported. The spur gear 55 is a drive gear and is keyed to a drive shaft 57 to prevent rotation of the gear 55 relative to the shaft 57. The drive shaft 57 is rotatably supported within the pump housing 50 by means of a bearing 60 supported by the pump housing 50. As will be discussed, the gear 55 and the drive shaft 57 can be shifted slightly in an axial direction to ensure the gear 55 is properly positioned within the pump. One end of the drive shaft 57 extends into the gear reducer 22. A cartridge 63 containing dual opposed lip seals 63a and 63b is carried by the pump housing 50 and surrounds the outer surface of the drive shaft 57. The lip seals 63a and 63b function to provide an effective seal when the associated pump chamber is at positive and negative relative pressures, respectively.

The spur gear 56 is an idler gear and is rotatably mounted upon an idler shaft 64 and is also free to shift axially along the idler shaft 64 to enable the gear 56 to be properly located within the pump. The idler shaft 64 is hollow and is pressed into a cylindrical cavity 65 formed in the pump housing 50.

Figures 11, 12, 13:
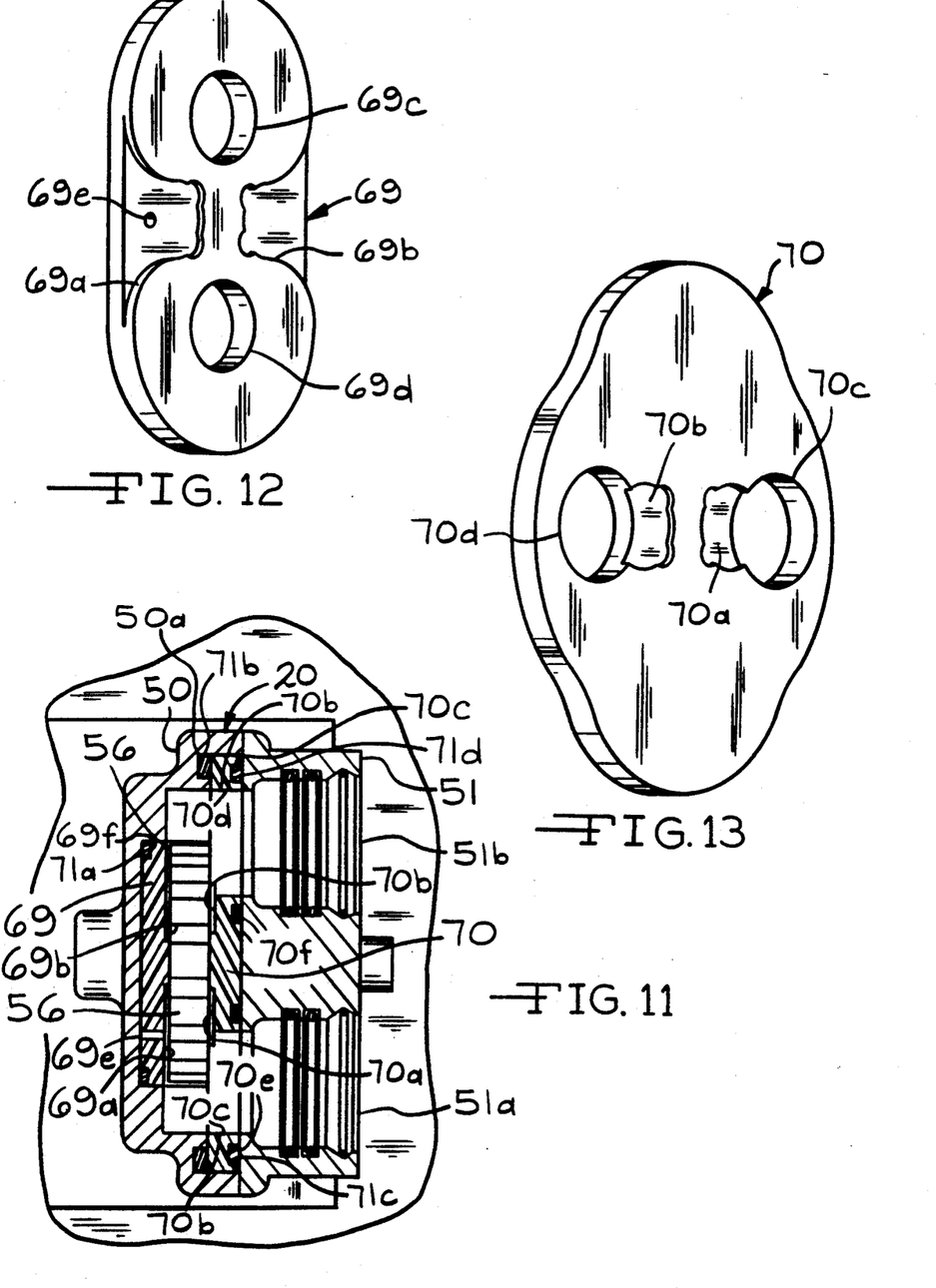
FIG. 11 is a sectional view taken along line 11—11 of FIG. 8.
FIG. 12 is a perspective view of a first type of gear end wear plate utilized in the gear pump shown in FIGS. 8 through 11.
FIG. 13 is a perspective view of a second type of gear end wear plate utilized in the gear pump shown in FIGS. 8 through 11.

In accordance with one feature of the present invention, an inner "moveable" wear plate 69 and an outer "fixed" wear plate 70 are located on opposite sides of the drive and idler spur gears 55 and 56. The wear plates 69 and 70 are constructed of a low friction material such as a carbon graphite material which can be, for example, "Pure Carbon" grade P6038C2. The inner wear plate 69, as shown in FIG. 12, is oval shaped with a pair of outer recesses 69a and 69b formed on the one side of the gear plate which faces and engages the spur gears. A pair of holes 69c and 69d are formed through the wear plate 69 to receive the drive shaft 57 and the idler shaft 64, respectively. A small third hole 69e, the purpose of which will be explained below, passing through the wear plate 69, is located within one of the surface recesses 69a and 69b, and is specifically shown in FIG. 12 within the recess 69a. The outer wear plate 70, as shown in FIG. 13, is epicycloidal in shape with a pair of inner recesses 70a and 70b formed in the one side which faces and engages the spur gears. The recesses 69a, 69b, 70a and 70b function to relieve pressure between the gear teeth during pump operation. A pair of holes 70c and 70d are formed through the wear plate 70 to allow the flow of liquid between the pump chamber and the pump ports 51a and 51b, respectively.

The wear plate 69 is biased against the adjacent side walls of the spur gears 55 and 56 by an inner O-ring 71a which is disposed in a shoulder 69f formed around the periphery of the inner wear plate 69. The inner O-ring 71a urges the inner wear 69 plate against the spur gear side walls. Since the spur gears 55 and 56 are mounted for limited axial movement, the force exerted by the inner O-ring 71a also presses the spur gears against the outer fixed wear plate 70. The hole 69e provides pressure equalization on each side of the plate 69 to ensure that the force biasing the plate 69 against the gears is exerted substantially by the O-ring 71a. By minimizing the clearance around the pump gears, the vacuum or suction lift capabilities of the pump 20 is greatly increased. Moreover, by utilizing a carbon graphite material to construct the wear plates 69 and 70, the pump 20 can effectively be run dry without supplemental lubrication.

As shown best in FIG. 8, an outer O-ring 71b is disposed in groove 50a formed in the outer end surface of the pump housing 50 to form a seal between the pump housing 50 and the outer fixed wear plate 70. As shown in FIG. 11, a pair of O-rings 71c and 71d are disposed in circular grooves 70e and 70f formed in the outer wear plate 70, and function to form a seal for the cover ports 51a and 51b, respectively.

Figure 9:
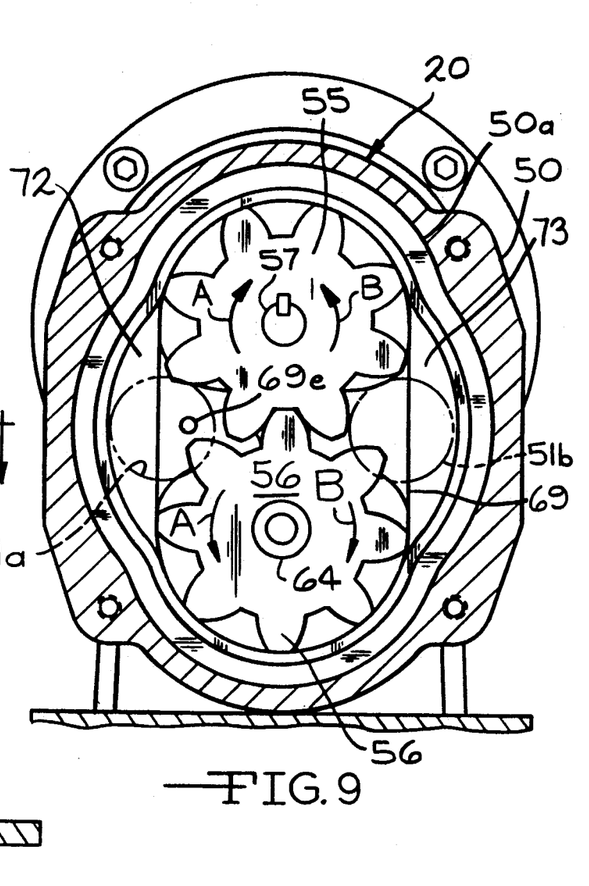
FIG. 9 is an end sectional view (taken along the line 9—9 of FIG. 8) through the gear pump shown in FIG. 8.
Figure 10:
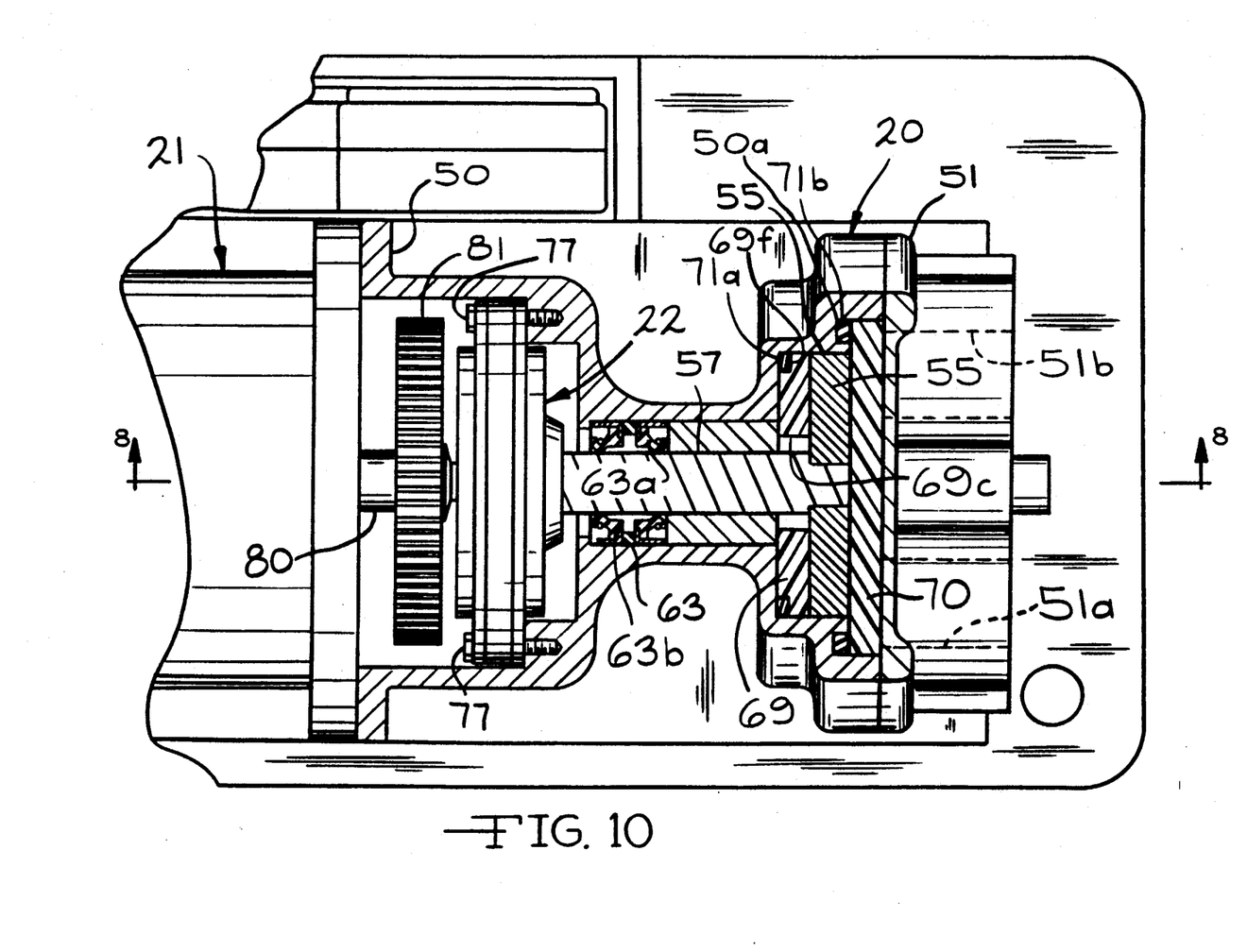
FIG. 10 is a sectional view taked along line 10—10 of FIG. 8.

As shown in FIG. 9, the spur gears 55 and 56, in conjunction with the pump housing 50, cooperate to define separate left and right chambers 72 and 73, respectively, located on opposite sides of the spur gears. The chamber 72 communicates with one of the cover port holes 51a (shown in phantom in FIG. 9), while the chamber 73 communicates with the other cover port hole 51b (also shown in phantom in FIG. 9). Depending on the particular rotation of the spur gears 55 and 56, one of the cover ports 51a and 51b functions as an inlet, while the other one of the ports functions as an outlet. For example, in operation, when the spur gears are operating in the direction A, as shown by the arrows in FIG. 9, fluid located in the left chamber 72 will be pulled around the outside of the gears and introduced into the right chamber 73. Thus, when rotating in the direction A, the one cover port 51a is an inlet while the other cover port 51b is an outlet. However, when rotating in the direction B, the one cover port 51a functions as an outlet while the other cover port 51b functions as an inlet.

As previously mentioned, the gear pump 20 is driven by the motor 21 through the gear reducer 22. The gear reducer, best seen in FIG. 8, is a conventional planetary gear type. The gear reducer 22 is secured to the pump housing 50 by a plurality of bolts 77. The gear reducer 22 is driven by a motor shaft 80. Use of a planetary gear type of gear reducer allows alignment of the motor shaft 80 and the gear pump drive shaft 57 on a common axis.

A target wheel 81 having a plurality of teeth formed about its circumference is mounted upon the motor drive shaft 80 between the motor 21 and the gear reducer 22. The rotation sensor 33 is shown in FIG. 8 as a variable reluctance, passive magnetic transducer 86 mounted in the bottom of the pump housing 50, and having a pole piece 87 located adjacent the periphery of the target wheel teeth.

Figure 14:
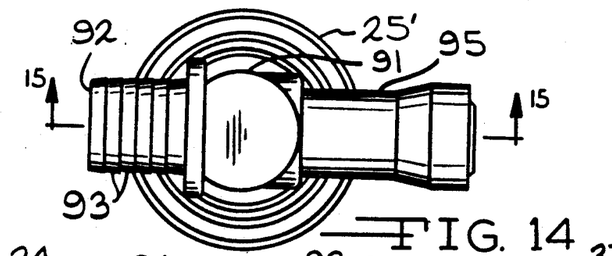
FIG. 14 is a top plan view of a restrictor valve of the type used in the "drain back" dispensing system of FIG. 4 which includes an integral vacuum breaker valve.
Figure 15:
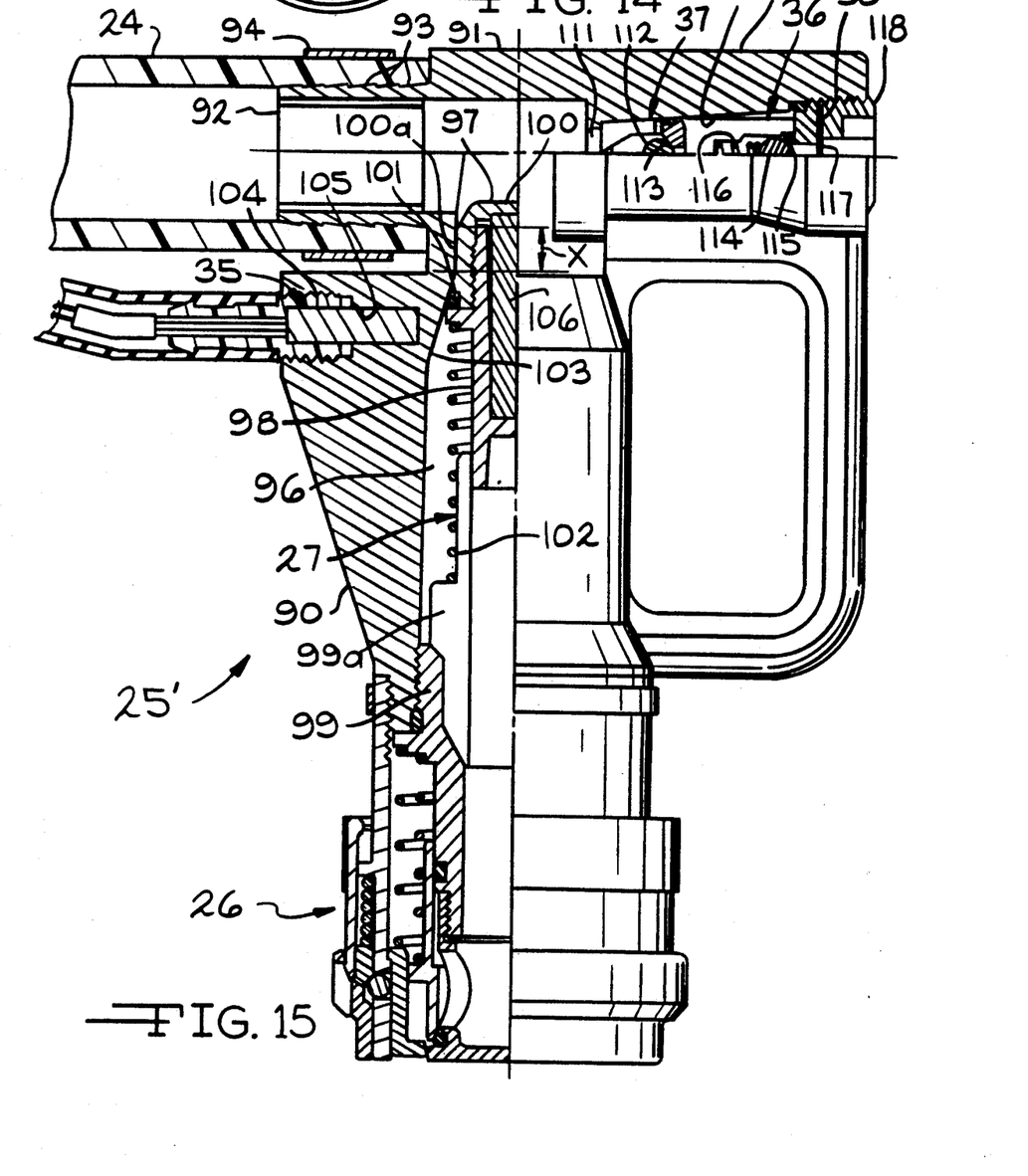
FIG. 15 is an enlarged partial sectional view taken along the line 15—15 of FIG. 14.

Referring now to FIGS. 14 and 15, there is shown a valve structure which can operate as the modified restrictor valve 25' shown schematically in FIGS. 4, 5 and 7. As shown in FIG. 15, the valve includes an outer plastic housing 90. A standard low spill dispensing coupling is shown generally at 26, and is threaded onto the bottom of the outer housing 90. The upper end of the housing 90 is formed into a T-shaped portion 91. One end of the T-shaped portion 91 is cylindrically shaped for insertion into the outer end of the discharge hose 24 and includes a plurality toothed hose barbs 93 which engage the inside surface of the hose 24. A ring 94 may be placed around the outside of the hose end to further secure attachment. The other end 95 of the T-shaped portion 91 contains the vacuum breaker valve 36, which will be described below.

The valve housing 90 includes a central fluid passageway 96 which contains the anti-siphon check valve 27. In FIG. 15, the valve 27 is shown as a spring loaded, poppet type valve including a poppet 97 which includes a hollow sleeve member 98 having one end which is slidably received within a hollow central guide 99. The guide 99 includes a plurality of radial openings 99a which allow fluid to flow from the central fluid passageway 96 into the dispensing coupling 26. The opposite end of the sleeve member 98 has an end cap 100 threadably secured thereto, and cooperates with the sleeve member 98 to define an outer annular groove for receiving an O-ring seal 101. A compression spring 102 is provided to bias the poppet 97 in a direction which urges the O-ring 101 against a conical sealing surface 103 formed in the upper portion of the central fluid passageway 96. The cap defines an axially extending cylindrical portion 100a, shown in FIG. 15 as having a length X, which is slidably received within a reduced diameter portion formed at the top of the passageway 96 immediately above the conical surface 103.

As previously mentioned, presence of liquid at the restrictor valve 25' is monitored by the liquid detecting switch 35. In FIG. 15, the liquid detecting switch 35 is shown as a reed switch 104 threaded into a cavity 105 formed in the housing 90. The reed switch 104 is responsive to movement of a magnet 106 located within the hollow sleeve member 98. The anti-siphon check valve 27 is designed, and reed switch 104 and the magnet 106 are situated, such that only the presence of a liquid causes the switch 104 to be actuated. Thus, in operation, when air pressure increases within the discharge hose 24 relative to the air pressure in the central fluid passageway 96, the poppet 97 will be shifted slightly to lift the O-ring 101 off the sealing surface 103, thereby allowing air to pass through the valve. This slight shift will not be a sufficient axial distance to cause the reed switch 104 to be actuated. However, the presence of a liquid at the poppet 97 causes the poppet to axially move the magnet 106 a sufficient distance (approximately the distance X shown in FIG. 15) to actuate the reed switch 104. When the switch is actuated, the electronic control 30 is signalled that liquid has reached the restrictor valve 25' and the system has been primed.

Also shown in FIG. 15 are the various vacuum breaker components which allow the system to achieve its drain back function. In particular, these components, which include the reverse flow safety check valve 37, the vacuum breaker valve 36, and the air filter 38, are housed within a cavity 110 formed in the end 95 of the the T-shaped portion 91 of the valve housing 90. The cavity 110 is connected by a short passageway 111 to the central passageway 96 at a point just above the poppet 97. In FIG. 15, the check valve 37 is shown as a conventional ball type valve 112 which, when positive pressure (relative to atmospheric pressure) exists in the passageway 111, will be urged against a valve seat 113. The vacuum breaker valve 36 includes a ball 114 which is urged against an O-ring seal 115 by a compression spring 116. The filter 38 consists of a screen 117 located adjacent the outer end of the vacuum breaker valve 36. A threaded hollow end plug 118 is provided to retain the components within the cavity 110.

The restrictor valve 25 of FIGS. 1 and 6 can have a structure essentially similar to the valve 25' of FIG. 15, except that the components in T-shaped portion of the valve relating to the vacuum breaker feature would not be included.

While various alternate embodiments of this invention have been described, it will be appreciated that the various features and embodiments may be combined or eliminated as required. For example, the system shown in FIG. 5 can be modified to eliminate the drain back feature. Also, in some instances it may be desirable to replace the restriction valve 25 or 25' with a user held and operated valve/nozzle (not shown). In this case, the valve nozzle could be provided with a trigger to be manually actuated by the user. The electronics control could be coupled to sense the actuation of the trigger, and control the pump in accordance with either preprogrammed instructions, or to dispense liquid "on demand", i.e., whenever the trigger is actuated.

Thus, it is seen that this invention provides a very accurate means of delivering predetermined batches of liquid products under carefully controlled conditions. Further, the system includes features to minimize exposure of the user to the product and to protect the surrounding environment from accidental spills of the product.

The principles and mode of operation of this invention have been explained and illustrated in its preferred embodiments. However, it must be understood that this invention may be practiced otherwise than as specifically explained and illustrated without departing from the scope of the following claims.

We claim:

1. A restrictor valve for use in a liquid dispensing system, said restrictor valve adapted to be coupled to the end of a discharge hose of the dispensing system and operable to discharge liquid into a receiving container, said restrictor valve comprising a housing defining a passageway having an inlet for connection to the end of the discharge hose and an outlet for connection to the receiving container, and a spring biased, shiftable anti-siphon check valve element mounted in said passageway to enable liquid flow through said restrictor valve in only an output direction, said check valve element operable to shift a first predetermined distance upon the presence of pressurized air at said inlet to allow air to escape from the discharge hose during the initial pumping operation, and operable to shift a second predetermined distance greater than said first predetermined distance when pressurized liquid is present at said inlet to allow liquid flow through the valve, and means for detecting the presence of liquid in said passageway operable to generate and maintain a signal representing liquid flow only after said check valve element has moved said second predetermined distance.

2. The valve according to claim 1 wherein said check valve element includes an axially extending portion which is slidably received within an axially extending portion of said passageway, said first and second portions having cooperating cross-sectional configurations wherein pressurized air at said inlet causes said element to shift said first predetermined distance and wherein pressurized liquid at said inlet causes said element to shift said second predetermined distance.

3. The valve according to claim 1 wherein said means for detecting includes a magnet carried by and moveable with said anti-siphon check valve element upon the presence of liquid flow through said passageway, and a switch means mounted in said housing and responsive to predetermined movement of said magnet.

4. The valve according to claim 3 wherein said switch means is a reed switch.

5. The valve according to claim 1 and further including a vacuum breaker connected between said inlet and the atmosphere.

6. The valve according to claim 5 wherein said vacuum breaker includes a ball spring biased into engagement with a sealing ring.

7. The valve according to claim 5 and further including a check valve connected between said vacuum breaker and said inlet to prevent liquid flow from said inlet to said vacuum breaker.

8. The valve according to claim 5 and further including a filter means connected between said vacuum breaker and the atmosphere.

9. The valve according to claim 1 wherein said outlet is provided with a low spill type coupling for connection to the receiving container, said coupling operable to prevent any liquid flow from said outlet when said coupling is disconnected from the receiving tank.

* * * * *